US011371667B2

(12) United States Patent
Jeong et al.

(10) Patent No.: US 11,371,667 B2
(45) Date of Patent: Jun. 28, 2022

(54) MULTIFUNCTIONAL SOLAR-POWERED LIGHTING DEVICES

(71) Applicant: MPOWERD Inc., Brooklyn, NY (US)

(72) Inventors: Seungah Jeong, Brooklyn, NY (US); John Salzinger, Brooklyn, NY (US); Mehmet Mailmail, New York, NY (US)

(73) Assignee: MPOWERD INC., Brooklyn, NY (US)

( * ) Notice: Subject to any disclaimer, the term of this patent is extended or adjusted under 35 U.S.C. 154(b) by 0 days.

(21) Appl. No.: 16/682,771

(22) Filed: Nov. 13, 2019

(65) Prior Publication Data

US 2020/0149695 A1 May 14, 2020

Related U.S. Application Data

(60) Provisional application No. 62/760,169, filed on Nov. 13, 2018.

(51) Int. Cl.
*F21S 9/03* (2006.01)
*F21V 23/00* (2015.01)
(Continued)

(52) U.S. Cl.
CPC .............. *F21S 9/037* (2013.01); *F16M 11/40* (2013.01); *F21V 15/01* (2013.01); *F21V 21/08* (2013.01); *F21V 21/145* (2013.01); *F21V 23/003* (2013.01); *F21V 23/02* (2013.01); *F21V 23/0485* (2013.01); *F21V 31/005* (2013.01);
(Continued)

(58) Field of Classification Search
CPC .......... F21S 9/037; F21V 15/01; F21V 21/08; F21V 21/32; F21V 21/145; F21V 21/0816; F21V 21/0885; F21V 23/003; F21V 23/02; F21V 23/0485; F21V 31/005; F21V 19/001; F21V 19/0015; F21V 19/002;
(Continued)

(56) References Cited

U.S. PATENT DOCUMENTS 5,154,483 A * 10/1992 Zeller ...................... F21L 4/04
362/198
5,931,560 A * 8/1999 Hoffman ................. F21V 21/32
362/124
(Continued)

FOREIGN PATENT DOCUMENTS

CN 206890362 U * 1/2018 .......... F21V 21/0808
EP 1684008 A1 * 7/2006 .......... F21V 21/0816
FR 2724007 A1 * 3/1996 .............. F21V 21/32

*Primary Examiner* — Erin Kryukova
(74) *Attorney, Agent, or Firm* — Bookoff McAndrews, PLLC (57) ABSTRACT

Lighting devices are described and may include a housing containing a rechargeable battery, a microprocessor, and a plurality of light sources in electronic communication with the rechargeable battery and the microprocessor. At least a portion of the housing may be transparent or translucent, wherein the plurality of light sources face the portion of the housing that is transparent or translucent. The lighting devices may be solar-powered, e.g., including a solar panel coupled to an outer surface of the housing, wherein the solar panel is in electronic communication with the rechargeable battery. The lighting devices herein also include a handle of a malleable material configured to adopt and maintain a variety of positions.

18 Claims, 4 Drawing Sheets

(51) Int. Cl.
*F21V 15/01* (2006.01)
*F21V 21/08* (2006.01)
*F21V 23/04* (2006.01)
*F21V 23/02* (2006.01)
*F21V 31/00* (2006.01)
*F16M 11/40* (2006.01)
*F21V 21/14* (2006.01)
*F21Y 113/13* (2016.01)
*F21Y 115/10* (2016.01)
*F21V 21/32* (2006.01)

(52) U.S. Cl.
CPC ............ *F21V 21/32* (2013.01); *F21Y 2113/13* (2016.08); *F21Y 2115/10* (2016.08)

(58) Field of Classification Search
CPC ....... F21V 19/0025; F21L 4/005; F21L 4/045; F21L 4/085; F21L 4/027; F16M 11/40
See application file for complete search history.

(56) References Cited

U.S. PATENT DOCUMENTS

| | | | |
|---|---|---|---|
| 6,206,542 B1 * | 3/2001 | Case | F21V 21/0925 362/190 |
| 6,682,198 B2 * | 1/2004 | Mangano | A45D 42/16 248/469 |
| RE38,897 E * | 11/2005 | Krenzel | F16M 11/40 362/191 |
| 7,390,105 B2 * | 6/2008 | Nelson | F21V 21/088 362/198 |
| D588,735 S * | 3/2009 | Woodard | D26/61 |
| 10,344,924 B1 * | 7/2019 | Ganahl | F21V 21/0885 |
| 2002/0118535 A1 * | 8/2002 | Nostrant | F21V 21/406 362/124 |
| 2008/0232097 A1 * | 9/2008 | Gandhi | F21L 4/04 362/191 |
| 2009/0168412 A1 * | 7/2009 | Murphy | F21L 4/04 362/202 |
| 2011/0310597 A1 * | 12/2011 | Lu | F21V 5/002 362/183 |
| 2014/0036511 A1 * | 2/2014 | Whitfield | F21V 29/763 362/311.02 |
| 2014/0098526 A1 * | 4/2014 | Lau | F21V 21/30 362/184 |
| 2015/0226370 A1 * | 8/2015 | Amussen | F16M 13/022 248/126 |
| 2017/0184260 A1 * | 6/2017 | Munoz Abogabir | F21V 23/023 |
| 2018/0295975 A1 * | 10/2018 | Washington | F16M 11/14 |
| 2018/0320855 A1 * | 11/2018 | Morgan | F21V 21/08 |

* cited by examiner

MULTIFUNCTIONAL SOLAR-POWERED LIGHTING DEVICES

CROSS-REFERENCE TO RELATED APPLICATIONS

This application claims priority to U.S. Provisional Application No. 62/760,169 filed on Nov. 13, 2018, which is incorporated by reference herein in its entirety.

TECHNICAL FIELD

The present disclosure includes solar-powered lights that are portable and include a handle that may serve a variety of functions and/or provide for a variety of uses.

BACKGROUND

There are an estimated three billion people without access to clean and reliable forms of electricity. In places such as Central and South America, Southeast Asia, and North America (amongst other territories), there is a need for efficient, multifunctional, consistent sources of light for homes as well as commercial, industrial, and governmental facilities.

SUMMARY

The present disclosure includes solar-powered lighting devices with handles configured to adopt and maintain the devices in a variety of positions. The solar-powered lighting devices herein may be useful in situations of intermittent access to electricity as a more stable and/or consistent source of light. The solar-powered lighting devices herein also may be more economical and/or portable than traditional grid-based lighting sources.

For example, the present disclosure includes a lighting device comprising a housing containing a rechargeable battery, a microprocessor, and a plurality of light sources in electronic communication with the rechargeable battery and the microprocessor, wherein at least a portion of the housing is transparent or translucent, and the plurality of light sources face the portion of the housing that is transparent or translucent; a solar panel coupled to an outer surface of the housing, the solar panel being in electronic communication with the rechargeable battery; and a handle extending from a first end coupled to the housing to a second end, wherein the handle comprises a malleable material configured to adopt and maintain a variety of positions. The length of the handle may be at least 6 inches, at least 12 inches, at least 24 inches, or at least 36 inches, for example. The handle may comprise a metal or metal alloy optionally covered by a sheath, such as a polymeric sheath. Additionally or alternatively, the housing may comprise a polymer, such as, e.g., acrylonitrile butadiene styrene, polypropylene, polyethylene, silicone, thermoplastic polyurethane, polyvinylchloride, or a combination thereof. In at least one example, the lighting device has a first configuration wherein the handle wraps around a perimeter of the housing. In the first configuration, for example, the second end of the handle may be proximate the first end of the handle as the handle wraps around the perimeter of the housing.

The housing may include a first component coupled to a second component in a detachable or permanent manner. The solar panel may be coupled to the first component, for example, and the second component may include the portion of the housing that is transparent or translucent. The first and second components may include complementary mating features. For example, one of the first component or the second component may include tabs complementary to surface features of the other of the first component or the second component that secure the first and second components together. The plurality of light sources may comprise light-emitting diodes (LEDs), e.g., at least 4 LEDs that include at least 1 white LED and/or at least 1 colored LED.

The present disclosure also includes a lighting device comprising a housing including a first component coupled to a second component, the housing containing a rechargeable battery, a microprocessor, and a plurality of light-emitting diodes (LEDs) in electronic communication with the rechargeable battery and the microprocessor, wherein the plurality of LEDs face a portion of the second component that is transparent or translucent; a solar panel coupled to an outer surface of the first component, the solar panel being in electronic communication with the rechargeable battery; and a handle extending from a first end coupled to the housing to a second end, wherein the handle comprises a metal or metal alloy covered by a polymeric sheath, the handle being configured to adopt and maintain a variety of positions. In at least one example, the second component comprises acrylonitrile butadiene styrene, polypropylene, polyethylene, silicone, thermoplastic polyurethane, polyvinylchloride, or a combination thereof. Further, for example, the plurality of LEDs may be contained within a chamber defined by an inner surface of the second component and a panel, e.g., a reflective panel. The panel may define apertures that receive, and are aligned with, the LEDs. According to some aspects of the present disclosure, one of the first component or the second component includes tabs complementary to surface features of the other of the first component or the second component that secure the first and second components together. The length of the handle may be about 6 inches to about 36 inches, for example.

The present disclosure also includes a lighting device comprising a housing containing a rechargeable battery, a microprocessor, and a plurality of light-emitting diodes (LEDs) in electronic communication with the rechargeable battery and the microprocessor, wherein the housing comprises a polymer and at least a portion of the housing is transparent or translucent, the plurality of LEDs facing the portion of the housing that is transparent or translucent; a solar panel coupled to an outer surface of the housing, the solar panel being in electronic communication with the rechargeable battery; and a handle extending from a first end coupled to the housing to a second end, wherein the handle comprises a malleable material covered by a sheath, such as a polymeric sheath, the handle being configured to adopt and maintain a variety of positions. The handle may be fixedly attached to the housing, and wherein the lighting device is water resistant or waterproof.

In at least one example, the housing of the lighting device is cylindrical in shape, and the lighting device has a first configuration wherein the handle wraps around a circumference of the housing such that the second end of the handle is proximate the first end of the handle. The lighting device may have a second configuration wherein the handle forms a coil configured to grip a support structure to hang the lighting device from the support structure. The plurality of LEDs may be contained within a chamber defined by an inner surface of the second component and a panel, e.g., a reflective panel, the plurality of LEDs including at least 1 white LED and at least 1 colored LED. In some examples herein, the housing includes at least one user element configured to receive user input and transmit the user input to the microprocessor to control operating modes of the plurality of LEDs.

In any of the examples described above and elsewhere herein, the handle may be sufficiently strong to support the weight of the lighting device when suspended from a support structure. For example, the handle may support at least 1 lb, at least 2 lbs, or at least 3 lbs or more weight.

BRIEF DESCRIPTION OF THE DRAWINGS

The accompanying drawings, which are incorporated in and constitute a part of this specification, illustrate various exemplary embodiments and together with the description, serve to explain the principles of the present disclosure.

DETAILED DESCRIPTION

The terminology used in this disclosure may be interpreted in its broadest reasonable manner, even though it is being used in conjunction with a detailed description of certain specific examples of the present disclosure. Both the foregoing general description and the following detailed description are exemplary and explanatory only and are not restrictive of the features, as claimed.

The singular forms "a," "an," and "the" include plural reference unless the context dictates otherwise. The terms "approximately" and "about" refer to being nearly the same as a referenced number or value. As used herein, the terms "approximately" and "about" generally should be understood to encompass ±5% of a specified amount or value. The terms "comprises," "comprising," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. The term "exemplary" is used in the sense of "example" rather than "ideal."

The present disclosure includes portable solar-powered lighting devices adapted to assume different configurations. For example, the lighting devices herein may include a handle configured to be manipulated by a user so as to place the lighting device in a variety of positions for use in different types of environments.

Figure 1:
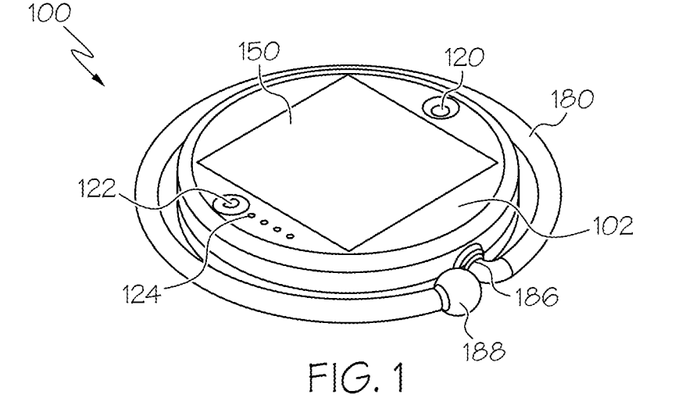
FIG. 1 shows a perspective view of an exemplary solar-powered lighting device, in accordance with some aspects of the present disclosure.
Figure 2:
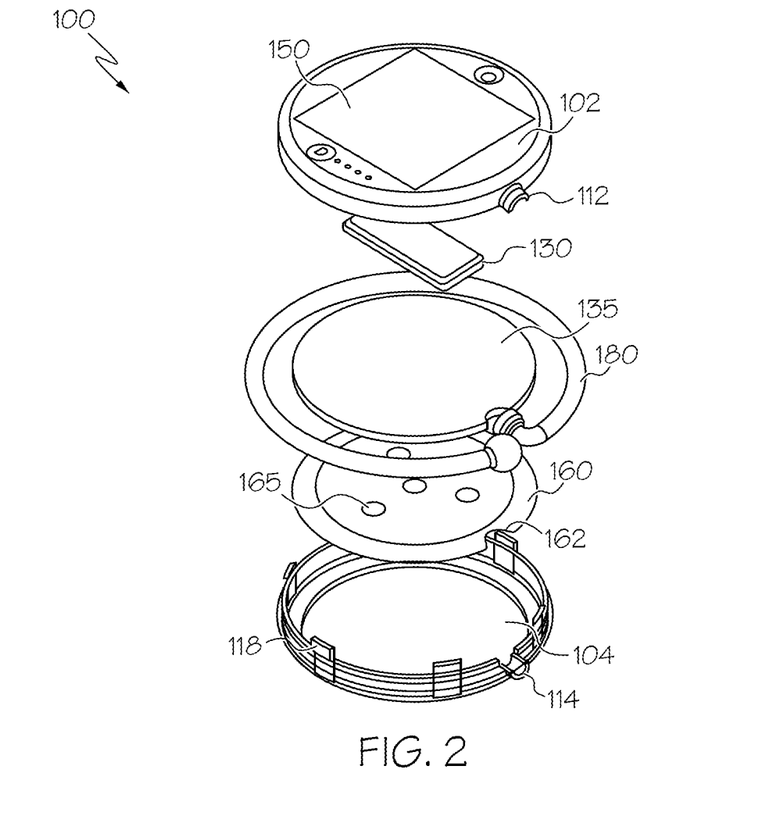
FIG. 2 shows an exploded view of the solar-powered lighting device of FIG. 1, in accordance with some aspects of the present disclosure.
Figure 3A:
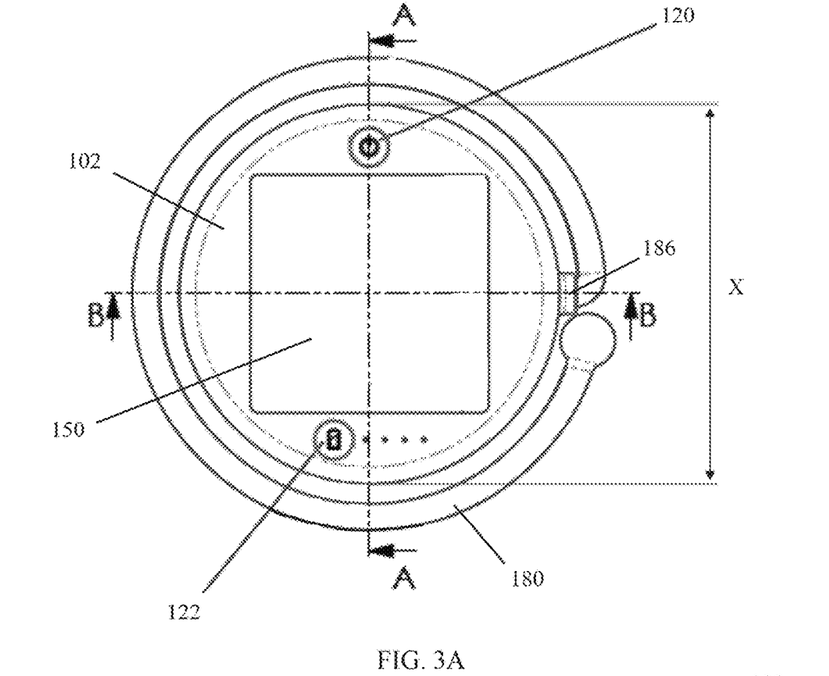
FIG. 3A shows a top view and FIG. 3B shows a side view of the solar-powered lighting device of FIG. 1, in accordance with some aspects of the present disclosure.
Figure 3B:
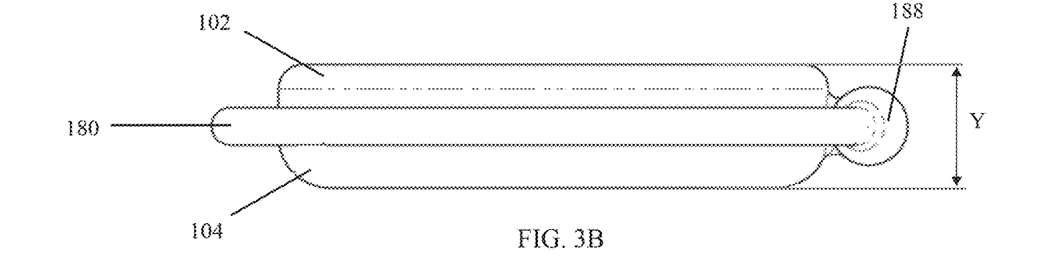
Figure 4A:
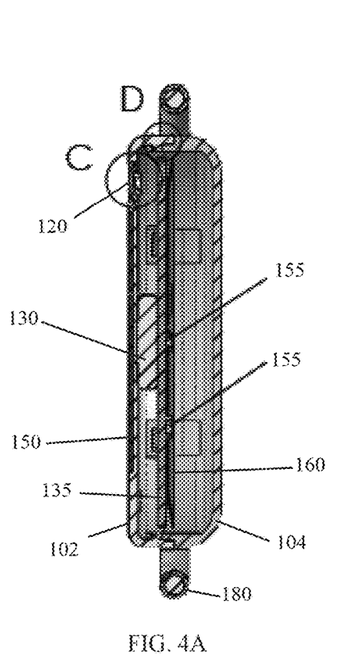
FIGS. 4A-4E show cross-sectional views of the solar-powered lighting device of FIG. 1, in accordance with some aspects of the present disclosure.
Figure 4B:
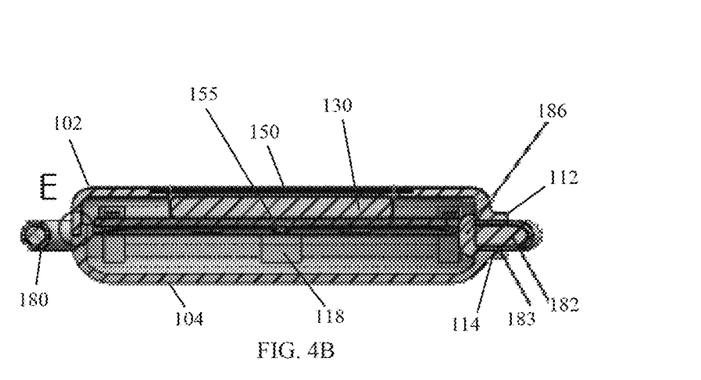
Figure 4C:
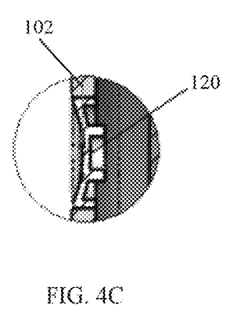
Figure 4D:
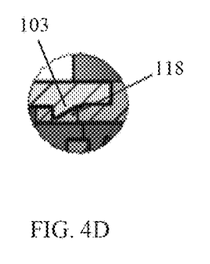
Figure 4E:
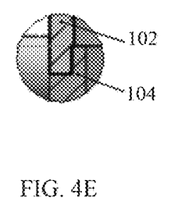

FIGS. 1-4E illustrate an exemplary solar-powered lighting device 100 in accordance with the present disclosure. FIG. 1 shows a perspective view of the lighting device 100, while FIG. 2 shows an exploded view. FIGS. 3A and 3B show a top view and side view, respectively, of the lighting device 100. FIG. 4A shows the cross-section of the lighting device 100 along axis A-A in FIG. 3A, wherein FIGS. 4C and 4D show close-ups of the areas designated "C" and "D," respectively, in FIG. 4A. FIG. 4B shows the cross-section of the lighting device 100 along axis B-B in FIG. 3A, wherein FIG. 4E shows a close-up of the area designated "E" in FIG. 4B.

As shown, the lighting device 100 includes a housing with a first component 102 and a second component 104 permanently attached or selectively detachable from one another, and a handle 180 coupled to the housing. While reference is made herein to separate first and second components 102, 104, the housing also may include a single integral component or more than two components configured to be assembled together. In some examples, the lighting device is not inflatable, e.g., the lighting device does not include an inflatable bladder.

The lighting devices herein may have any suitable shape. The housing may be cylindrical in shape with a circular cross-section, as shown, or any other cross-sectional shape such as, e.g., polygonal (triangular, square, rectangular, pentagonal, etc.), oval, or other suitable shape. Further, the cross-sectional shape and/or dimensions optionally may vary. For example, the lighting device may have a substantially uniform cross-sectional dimension along its height (e.g., the first component 102 having a diameter X that is equal or substantially equal to the diameter X of the second component 104; see FIG. 3A), or may have a tapered shape wherein the cross-sectional dimension of the first component 102 is greater or less than the cross-sectional dimension of the second component 104. The housing may have rounded corners or edges, as illustrated in FIG. 3A. Further, for example, the second component 104 may have a somewhat tapered shape, as illustrated in FIG. 3B.

The housing may comprise a polymer or combination of polymer materials, which may be selected to be durable. For example, the first component 102 and/or the second component 104 may comprise acrylonitrile butadiene styrene (ABS), polypropylene, polyethylene, silicone, polyurethane, including thermoplastic polyurethane (TPU), polyvinylchloride (PVC), or a combination thereof. The housing may be crack-resistant and/or crack-proof. All or portion of the housing may be translucent and/or may have a pattern. According to some aspects of the present disclosure, the first and/or second component 102, 104 comprises frosted high-quality ABS plastic. The housing may be water resistant and/or waterproof.

The lighting device 100 may include one or more solar panels 150 coupled to or integrated into an outer surface of the housing so as to allow for exposure to natural and/or artificial light. Referring to FIG. 1, for example, the lighting device 100 includes at least one solar panel 150 coupled to or integrated into an outer surface of the first component 102. The solar panel(s) 150 may comprise silicon, e.g., monocrystalline or polycrystalline silicon. The solar panel(s) 150 may be incorporated into a wall of the first component 102 or may fit within a recessed area (e.g., with an aperture to allow for an electronic connection to internal components) of the first component 102, such that the solar panel(s) 150 are substantially flush with the surrounding surface of the first component 102. The solar panel(s) 150 may be backed by a support material such as polycarbonate or other plastic or polymer, or may be in direct contact with the first component 102. The surface of the solar panel(s) 150 may include a protective film or resin to protect against damage and/or exposure to contaminants.

The solar panel(s) 150 may be operably coupled to, that is, in electronic communication with, electronic components within the housing. As illustrated in FIGS. 2, 4A, and 4B, the housing of the lighting device 100 contains a rechargeable battery 130 (e.g., a ferric or lithium ion battery), one or more light-emitting diodes 155 (LEDs), which may be operably coupled to a printed circuit board (PCB) 135, along with one or more processors or microprocessors that may be coupled to the PCB 135. The housing also may contain a panel 160 adjacent to the PCB 135, wherein the panel 160 defines one or more apertures 165 aligned with the one or more LEDs 155. The panel 160 may be reflective or otherwise include a reflective surface to promote diffusion of light emitting by the LEDs 155 in a chamber defined by the second component 104 and the panel 160. The lighting device 100 optionally may include one or more electronic connectors, such as a USB port or USB-type port (including, e.g., micro-USB ports), to allow for charging of external electronic devices and/or to allow for charging the lighting device 100 with an external power source.

The rechargeable battery 130 may have a capacity ranging from about 100 mAh to about 3500 mAh, e.g., about 1500 mAh to about 3500 mAh, about 2000 mAh to about 3000 mAh, or about 3000 mAh to about 3500 mAh, e.g., about 200 mAh, about 250 mAh, about 300 mAh, about 350 mAh, about 400 mAh, about 450 mAh, about 500 mAh about 550 mAh, about 600 mAh, about 1000 mAh, about 1500 mAh, about 2000 mAh, about 2500 mAh or about 3000 mAh. According to some examples herein, the capacity of the battery 130 may be sufficient to sustain a runtime of at least 6 hours, at least 12 hours, or at least 18 hours or more. In at least one example, the battery 130 has a capacity of 500 mAh and a runtime of about 12-16 hours on 15 lumens. In some examples, the solar-powered lighting devices herein may be configured to recharge the battery 130 in less than 24 hours, less than 18 hours, less than 12 hours, or less than 6 hours, such as from about 2 hours to about 15 hours, or from about 6 hours to about 12 hours.

The lighting devices herein may be relatively compact and/or lightweight to facilitate portability and manipulability. For example, the lighting device 100 may have a total weight less than 12 ounces, less than 10 ounces, less than 8 ounces, less than 6 ounces, or less than 4 ounces, e.g., a weight of 3 to 8 ounces, or 2 to 4 ounces. Further, for example, the maximum cross-sectional dimension of the housing (width X in FIG. 3A) may be less than or equal to 6 inches, less than or equal to 5 inches, or less than or equal to 4 inches, e.g., from about 3 to 5 inches. Additionally or alternatively, the height of the housing (height Y in FIG. 3B) may be less than or equal to 3 inches, such as less than or equal to 1 inches, less than or equal to 1.5 inch, or less than or equal to 1 inch, such as from 0.5 to 2 inches, or from 1 to 1.5 inches.

Each of the first and/or second component 102, 104 may be rigid and/or include one or more user interfaces, such as buttons, switches, touchscreens, dials, etc. The user interface(s) may allow a user to power the light (light source(s)) on and off, to select different operating modes of the light source(s), and/or to check the amount of power or charge remaining in the battery 130. The user interface(s) optionally may be indented relative to the surrounding surface of the housing (e.g., indented relative to the surrounding surface of the first component 102, see FIG. 4C) to facilitate locating the user interface(s) by touch.

As shown in FIG. 1, for example, the lighting device 100 includes a first user interface in the form of a power button 120 to turn the LEDs 155 of the lighting device 100 on and off (the power button 120 being operably coupled to the PCB 135 and battery 130 to control the LEDs 155). The lighting device 100 also includes a second user interface in the form of a battery indicator 122 that provides information regarding the amount of power remaining in the battery 130 via a plurality of indicator lights 124 (the battery indicator 122 being operably coupled to the PCB 135 and rechargeable battery 130). The indicator lights 124 may be LEDs, and optionally may illuminate and/or display different colors based on different power levels. Thus, for example, a red light may indicate low power, a green light may indicate full charge or close to full charge, and a yellow light may indicate an intermediate amount of power. Additionally or alternatively, the number of indicator lights 124 illuminated may provide information as to the amount of power remaining. Thus, for example, all indicator lights 124 (e.g., 4 LEDs as illustrated in FIG. 1) being illuminated may correspond to a full charge, whereas fewer indicator lights 124 being illuminated may indicate lower amounts of power.

The LED(s) 155 may be positioned to emit light towards the second component 104 (e.g., in a direction opposite the solar panel 105), within a chamber defined by the second component 104, wherein at least a portion of the material of the second component 104 may be configured to allow light to pass therethrough. Thus, for example, all or a part of the second component 104 may be at least partially transparent or translucent to allow the light to pass therethrough. For example, the second component 104 may comprise frosted ABS to allow for diffusion of light, the second component 104 having any color, such as white, blue, yellow, green, red, purple, etc. Additional polymers and other suitable materials including glass (e.g., glass with shatter resistance) are also contemplated and encompassed herein. The material used to form the second component 104 may allow for even dispersion of light. In some examples, the second component 104 may allow for a diffuse lighting pattern, e.g., such that the light is emitted from the housing at angles or in an arc to provide diffuse room lighting. According to some aspects of the present disclosure, the bottom component additionally or alternatively may provide for a more focused beam of light.

The LED(s) 155 may be configured to emit white light and/or various colors of light, such as red, blue, green, etc. The lighting devices herein may include a single LED or a plurality of LEDs, e.g., 2, 3, 4, 5, or 6 or more LEDs. For example, the lighting device 100 includes 4 LEDs aligned with corresponding apertures 165 of the panel 160 (see FIG. 2). In some examples, the solar-powered lighting device 100 includes at least 1 white LED and at least 1 colored LED, e.g., 3 white LEDs and 1 or more red LEDs. For example, the LEDs may include 1 red LED and 3 white LEDs arranged around the red LED. The LEDs may provide an amount of light of about 10 lumens to about 500 lumens, such as about 15 lumens, about 25 lumens, about 30 lumens, about 35 lumens, about 40 lumens, about 45 lumens, about 50 lumens, about 55 lumens, about 60 lumens, about 75 lumens, about 100 lumens, about 200 lumens, about 250 lumens, about 300 lumens, or about 400 lumens.

The LEDs 155 may be operated in different operating modes, such as varying levels of intensity, on/off flashing or other patterns, and/or different colors. The different operating modes may be stored and controlled by the microprocessor. For example, the LEDs 155 may be operated a different levels of intensity, such as low (such as about 20-40 lumens, e.g., 15 lumens), medium (such as about 50-75 lumens, e.g., 55 lumens), high (such as about 75-150 lumens, e.g., 100 lumens). Additionally or alternatively, the LEDs 155 may be operated in different patterns, such as flashing (e.g., on/off, such as at a low, medium, or high intensity). Further, for example, the LEDs may maintain a selected color, such as a steady red light (e.g., at a low, medium, or high intensity). A user may be able to power the LEDs 155 on/off and/or select different operating modes via the user interface(s), e.g., via power button 120. In at least one example, a first selection (e.g., press of a button) turns the light on a low intensity setting, a second selection increases the intensity to a medium setting, a third selection increases the intensity to a high setting, a fourth selection initiates a flashing mode (e.g., 1 second on/off), and a fifth selection initiates a steady color, mode, such as a steady red light). Additional selection(s) may turn the light off or initiate other operating modes of the LEDs 155.

When the housing includes two or more components, the components may be coupled together by any suitable mating features or mechanism. For example, the first and second components 102, 104 may include complementary tabs or clips. In at least one example, the first component 102 may be configured to fit over a circumferential ledge of the second component 104, e.g., such that the inner surface of the first component 102 fits tightly against the outer surface of the ledge, as illustrated in FIG. 4E. Further, the second component 104 may include at least one tab 118 that defines a recessed area on its outer facing surface that receives a complementary projection 103 along the inner surface of the first component, as illustrated in FIG. 4D. The second component 104 may include one tab 118 or a plurality of tabs 118, e.g., 2, 3, 4, 5, or 6 or more tabs 118, spaced at regular intervals. The first component 102 may have a corresponding number of projections 103 to allow the two components 102, 104 to be secured together. The tab(s) 118 may comprise a polymer or other material that allows them to flex inward as the first component 102 is secured to the second component 104. This arrangement is exemplary only. For example, the second component 104 may be configured to fit over a ledge of the first component 102, wherein the first component 102 includes a plurality of tabs with recesses that receive corresponding projections of the second component 104. Further, the first and second components 102, 104 may be coupled together by threaded portions, magnets, or other types of mating features. In at least one example, the first and second components 102, 104 are fixedly attached to one another to provide for a water resistant or waterproof housing.

As mentioned above, the solar-powered lighting devices herein also include a handle that may be manipulated into different configurations. Referring to FIGS. 1 and 2, the lighting device 100 includes a handle 180 extending from a first end 186 coupled to the housing to a second end 188. According to some examples herein, the first component 102 and second component 102 include complementary recesses 112, 114 (the panel 160 also including a recess 162) that together define an opening from which the handle 180 extends. The handle 180 may be secured to the housing with an adhesive and/or a suitable mechanism. In at least one example, the first end 186 of the handle 180 includes an annular ridge with an outermost diameter greater than the diameter of the opening, such that the ridge does not pass through the opening, therefore securing the handle 180 to the housing. Optionally, the first end 186 of the handle 180 also may be secured to the housing with an adhesive. Additional mechanisms for securing the handle 180 to the housing are contemplated and included in the present disclosure such as, e.g., tabs, clips, threads, magnets, etc. The first end 186 of the handle 180 may be detachable or permanently attached to the housing. In at least one example, the handle 180 is fixedly attached to the housing to provide for a water resistant or waterproof housing. The second end 188 of the handle 180 may include a cap having a cross-sectional dimension (e.g., diameter) greater than the cross-sectional dimension (e.g., diameter) of the remainder of the handle 180. The cap may have a decorative appearance and may be removable or fixedly attached to the remainder of the handle 180.

The handle 180 may comprise a malleable and/or bendable material or combination of materials, such as a metal, metal alloy, and/or bendable polymer(s), such that the handle 180 may be manipulated to adopt and maintain a variety of positions. In at least one example, the handle 180 includes a flexible metal wire 182 covered by a flexible polymeric sheath or sleeve 183, e.g., a silicone or rubber sleeve. The handle 180 therefore may be manipulated to assume, for example, a variety of extended positions suitable for hanging the lighting device 100 from a support structure, such as a bed frame, hook, wall, ceiling, desk, bookcase, pole, etc. (see also FIG. 5). According to some aspects of the present disclosure, the handle 180 may be sufficiently strong to hold up to 1 lb (16 oz), up to 2 lbs, or up to 3 lbs or more weight, e.g., at least 1 lb, at least 2 lbs, or at least 3 lbs of weight.

In at least one example, the length of the handle 180 may be approximately equal to the perimeter of the housing of the lighting device 100, e.g., such that the length of the handle 180 may wrap around the housing with the second end 188 of the handle proximate the first end 186 (see, e.g., FIGS. 1, 2, 3A, and 3B). The handle 180 may be shorter or longer, however. The length of the handle may be at least 4 inches, at least 6 inches, at least 8 inches, at least 10 inches, at least 12 inches, at least 14 inches, at least 16 inches, at least 18 inches, at least 20 inches, at least 22 inches, at least 24 inches, at least 26 inches, at least 28 inches, at least 30 inches, or at least 36 inches or more. In some examples, the length of the handle 180 may be between about 6 inches and about 36 inches, e.g., a length of about 12 inches to about 16 inches, about 6 inches to about 8 inches, about 12 inches to about 24 inches, about 8 inches to about 12 inches, about 20 inches to about 24 inches, about 10 inches to about 14 inches, or about 16 inches to about 22 inches.

Figure 5:
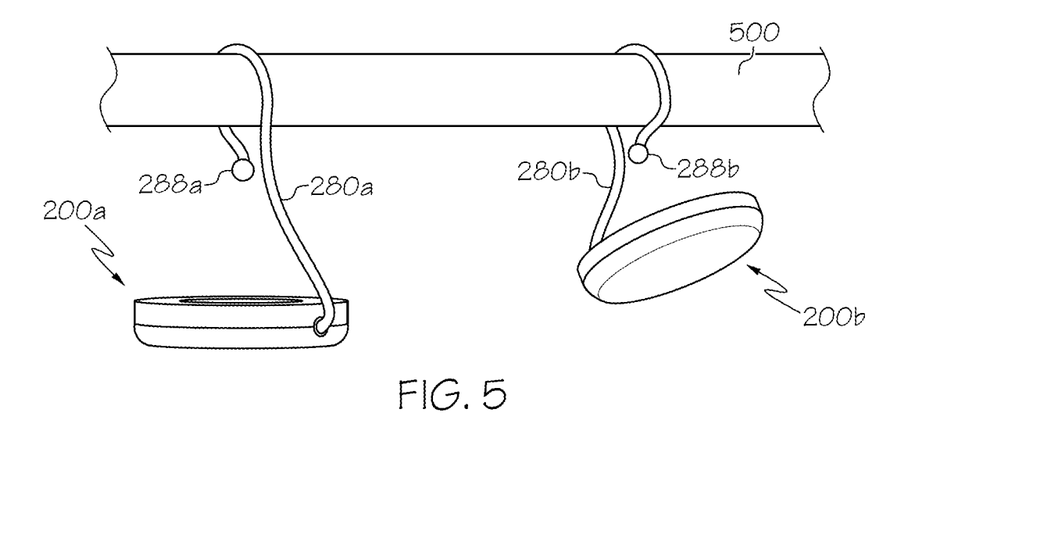
FIGS. 5 and 6 show various configurations of exemplary solar-powered lighting devices, in accordance with some aspects of the present disclosure.
Figure 6:
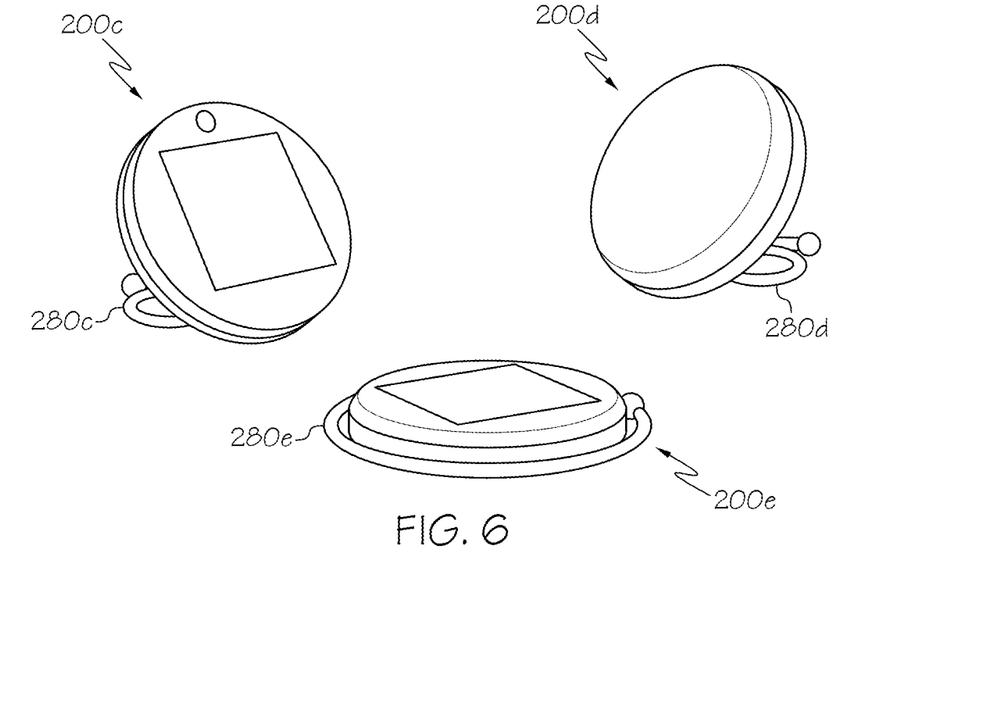

The flexibility of the handle of the solar-powered lighting devices herein may provide for a range of motion that allows a user to twist and bend the handle to assume a variety of configurations. FIGS. 5 and 6 illustrate solar-powered lighting devices 200a, 200b, 200c, 200d, 200e that may include any of the features of lighting device 100 above. In FIG. 5, two lighting devices 200a, 200b are depicted hanging from a support 500, such as a beam or pole, via their respective handles 280a, 280b. That is, each handle 280a, 280b is curved so as to grip the support 500, each handle 280a, 280b curving back on itself with the second end 288a, 288b of the respective handle 280a, 280b proximate an inner portion of the respective handle 280a, 280b. The length of the handles 280a, 280b may be sufficiently long to allow for coiling around the support 500 two or more times. By further manipulating other portions of the handle, the user may tilt the lighting devices 200a, 200b so as to shine light in a desired direction. Once placed in a desired configuration, the handles 280a, 280b may maintain the configuration unless and until the user changes the configuration.

FIG. 6 illustrates exemplary configurations of lighting devices 200c, 200d, 200e placed on a table or other surface. For example, lighting device 200c is shown with the solar panel surface tilted up and facing outward, wherein the handle 280c supports the opposite side of the lighting device 200c. Lighting device 200d is shown in a similar configuration, but with the light-emitting surface (e.g., similar to second component 104 of lighting device 100) tilted up and facing outward, the handle 280d supporting the opposite, solar panel side of the lighting device 200d. Thus, for example, lighting device 200c is shown in a configuration suitable for recharging the device 200c by exposing the solar panel to the sun or artificial light, while lighting device 200d is shown in a configuration suitable for use in generating light. Lighting device 200e is shown in a configuration convenient for storage when not in use, or for charging, wherein the handle 280e is arranged along the perimeter of the housing in a manner similar to lighting device 100 shown in FIG. 1.

It is intended that the specification and examples be considered as exemplary only, with a true scope and spirit of the present disclosure being indicated by the following claims.

What is claimed is:

1. A lighting device comprising:
   a housing including a first component coupled to a second component, the housing containing a reflective panel positioned between the first component and the second component, a rechargeable battery, a printed circuit board (PCB), and a plurality of light sources in electronic communication with the rechargeable battery and the PCB, wherein at least a portion of the housing is transparent or translucent, and the plurality of light sources face the portion of the housing that is transparent or translucent;
   a solar panel coupled to an outer surface of the housing, the solar panel being in electronic communication with the rechargeable battery; and
   a handle extending from a first end coupled to the housing to a second end, wherein the first end has a diameter greater than a diameter of an opening through which the handle extends, such that the first end is fixed relative to the housing, wherein the first component, the second component, and the reflective panel each include a recess, the recesses collectively defining the diameter of the opening, and wherein the handle comprises a malleable material configured to adopt and maintain a variety of positions.

2. The lighting device of claim 1, wherein the second end of the handle includes a cap that has a diameter greater than a diameter of the remainder of the handle.

3. The lighting device of claim 1, wherein the handle comprises a metal or metal alloy.

4. The lighting device of claim 1, wherein the housing comprises a polymer.

5. The lighting device of claim 1, wherein the lighting device has a first configuration wherein the handle wraps around a perimeter of the housing, the second end of the handle being proximate the first end of the handle.

6. The lighting device of claim 1, wherein the solar panel is coupled to the first component, and the second component includes the portion of the housing that is transparent or translucent.

7. The lighting device of claim 1, wherein one of the first component or the second component includes tabs complementary to surface features of the other of the first component or the second component that secure the first and second components together.

8. The lighting device of claim 1, wherein the plurality of light sources comprises at least four light-emitting diodes (LEDs) including at least 1 white LED and at least 1 colored LED.

9. A lighting device comprising:
   a housing including a first component coupled to a second component, the housing containing a reflective panel, a rechargeable battery, a printed circuit board (PCB), and a plurality of light-emitting diodes (LEDs) in electronic communication with the rechargeable battery and the PCB, wherein the plurality of LEDs face a portion of the second component that is transparent or translucent, and wherein the plurality of LEDS are contained within a chamber defined by an inner surface of the second component and the reflective panel;
   a solar panel coupled to an outer surface of the first component, the solar panel being in electronic communication with the rechargeable battery; and
   a handle extending from a first end coupled to the housing to a second end, wherein the first end includes a ridge disposed inside the housing, the ridge having a size greater than an opening through which the handle extends to thereby secure the handle to the housing, wherein each of the first component, the second component, and the reflective panel includes a recess, the recesses collectively defining the opening, wherein the handle comprises a metal or metal alloy covered by a polymeric sheath, the handle being configured to adopt and maintain a variety of positions.

10. The lighting device of claim 9, wherein the second component comprises acrylonitrile butadiene styrene, polypropylene, polyethylene, silicone, thermoplastic polyurethane, polyvinylchloride, or a combination thereof.

11. The lighting device of claim 9, wherein one of the first component or the second component includes tabs complementary to surface features of the other of the first component or the second component that secure the first and second components together.

12. The lighting device of claim 9, wherein a length of the handle is about 6 inches to about 36 inches.

13. A lighting device comprising:
    a housing including a first component coupled to a second component, the housing containing a reflective panel, a rechargeable battery, a printed circuit board (PCB), and a plurality of light-emitting diodes (LEDs) in electronic communication with the rechargeable battery and the PCB, wherein the housing comprises a polymer and at least a portion of the second component is transparent or translucent, the plurality of LEDs facing the portion of the second component that is transparent or translucent;
    a solar panel coupled to an outer surface of the first component, the solar panel being in electronic communication with the rechargeable battery; and
    a handle extending from a first end coupled to the housing to a second end, each of the first end and the second end having a cross-sectional dimension greater than a cross-sectional dimension of an opening through which the handle extends, wherein the handle comprises a malleable material covered by a polymeric sheath, the handle being configured to adopt and maintain a variety of positions, wherein the first component, the second component, and the reflective panel each include a recess, the recesses collectively defining the opening.

14. The lighting device of claim 13, wherein the handle is fixedly attached to the housing, and wherein the lighting device is water resistant or waterproof.

15. The lighting device of claim 13, wherein the housing is cylindrical in shape, and the lighting device has a first configuration wherein the handle wraps around a circumference of the housing such that the second end of the handle is proximate the first end of the handle.

16. The lighting device of claim 15, wherein the lighting device has a second configuration wherein the handle forms a coil configured to grip a support structure to hang the lighting device from the support structure.

17. The lighting device of claim 13, wherein the plurality of LEDs are contained within a chamber defined by an inner surface of the second component and the reflective panel, the plurality of LEDs including at least 1 white LED and at least 1 colored LED.

18. The lighting device of claim 13, wherein the housing includes at least one user element configured to receive user input and transmit the user input to the PCB to control operating modes of the plurality of LEDs.

* * * * *